United States Patent
Matsubayashi

(10) Patent No.: US 6,266,611 B1
(45) Date of Patent: Jul. 24, 2001

(54) IMAGE PROCESSING METHOD AND APPARATUS AND STORING MEDIUM

(75) Inventor: Kazuhiro Matsubayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/039,228

(22) Filed: Mar. 16, 1998

(30) Foreign Application Priority Data

Mar. 18, 1997 (JP) .................................................. 9-083371

(51) Int. Cl.⁷ .................................................. G01C 21/20
(52) U.S. Cl. .......................... 701/202; 701/210; 701/211; 340/995
(58) Field of Search .................................... 701/201, 202, 701/205, 207, 208, 209, 210, 211; 340/990, 995

(56) References Cited

U.S. PATENT DOCUMENTS

| | | | |
|---|---|---|---|
| 4,511,973 | * | 4/1985 | Miru et al. .......................... 701/207 |
| 4,578,768 | * | 3/1986 | Racine .................................. 364/560 |
| 5,268,844 | * | 12/1993 | Carver et al. ........................ 701/200 |
| 5,475,387 | * | 12/1995 | Matsumoto ........................... 340/990 |
| 5,646,856 | * | 7/1997 | Kaesser ................................ 701/210 |
| 5,754,430 | * | 5/1998 | Saeada .................................. 370/336 |
| 5,757,788 | * | 5/1998 | Tatsumi et al. ....................... 370/336 |
| 5,774,362 | * | 6/1998 | Suzuki et al. ........................ 701/200 |
| 5,774,824 | * | 6/1998 | Streit et al. .......................... 701/207 |
| 5,828,568 | | 10/1998 | Sunakawa et al. .................. 364/184 |
| 5,893,898 | * | 4/1999 | Tanimoto ............................. 701/201 |

* cited by examiner

*Primary Examiner*—Tan Nguyen
(74) *Attorney, Agent, or Firm*—Fitzpatrick, Cella, Harper & Scinto

(57) ABSTRACT

An operation by which an operator can select a desired route on a screen on which a road network is displayed is simplified, and the selected route can be promptly and accurately inputted. The invention is particularly well-suited in instances where the operator wants to manually select a route according to his or her personal preference, for example, where the operator wants to select a main road which he or she knows well or where he or she wants to pass a road that he or she would like to see. For this purpose, on a map displayed on the basis of road data which has previously been stored, the operator instructs a location near the desired route, and by dragging a pen, for example, sequentially selects the roads near the instructed locus, and thus enabling the instructed route to be determined.

69 Claims, 7 Drawing Sheets

IMAGE PROCESSING METHOD AND APPARATUS AND STORING MEDIUM

BACKGROUND OF THE INVENTION

1. Field of the Invention

The invention relates to a technique for displaying a map on a screen.

The invention also relates to a technique for selecting a desired route from road information having branching points The invention further relates to a technique for determining a road selected on a displayed map.

2. Related Background Art

FIG. 7 is a block diagram showing the hardware configuration of conventional map display apparatus. In the diagram, reference numeral 701 denotes a CPU (central processing unit) for controlling the whole apparatus; 702 denotes a ROM (read only memory) for storing a control program which is executed by the CPU 701; 703 denotes a RAM (random access memory) in which map data, a control program, and the like are stored; 704 denotes a HDD (hard disk drive) in which the map data, control program, and the like are stored; 705 denotes a CD-ROM (compact disc—read only memory) in which the map data, control program, and the like are stored; and 706 denotes a mouse for instructing a point on a display screen, which will be explained below. The mouse 706 has a mouse button 707 which is clicked when inputting coordinate data. Reference numeral 708 denotes a display comprising a cathode ray tube (CRT) or the like for displaying a road network or the like on a screen.

The map data is stored in the CD-ROM 705 and is read out and stored into the RAM 703 or HDD 704 as necessary. The map data is processed by the program which is executed by the CPU 701, and is displayed on the display 708. A point instructed by the mouse 706 is displayed as a cursor on the screen of the display 708. Coordinate data is selected by clicking the mouse button 707.

FIG. 8 is a functional block diagram of one type of conventional map display apparatus. In the diagram, reference numeral 801 denotes a road data storing unit; 802 denotes a road network display; 803 denotes a coordinate input unit; and 804 denotes a broken-line figure output unit.

The road data storing unit 801 contains at least coordinate data for displaying a road, such as a roadway, railroad, or the like on the screen. The road network display 802 reads out road data for a predetermined section and displays a road network on the screen. To input a route of the road network, the cursor is first moved onto a start point of the route and the mouse button 707 is clicked, causing the coordinate input unit 803 to input coordinates corresponding to the selected point. The broken-line figure output unit 804 outputs a broken-line figure representing a route obtained by sequentially connecting a series of coordinates input in this manner.

FIG. 9 is a functional block diagram of a second type of conventional map display apparatus which has an automatic searching function. In the diagram, reference numeral 901 denotes a road data storing unit; 902 denotes a road network display; 903 denotes a coordinate input unit; and 904 denotes a route searcher.

Data which is stored in the road data storing unit 901 includes at least one set of coordinate data for displaying a road, such as roadway, railroad, or the like on the screen, and one set of data showing a branching point with another road. Further, by having stored data relating to distances, required times, and the like for sections of each road, information regarding the route obtained by connecting the roads can be outputted. The road network display 902 reads out road data for a predetermined section and displays a road network onto the screen. To input a route of the road network, the cursor is first moved onto a start point of the route and the mouse button 707 is clicked, causing the coordinate input unit 903 to input coordinates corresponding to the position of the cursor at that time as a start point. By moving the cursor along the route and by clicking the mouse button 707 at a main transit point, the coordinates corresponding to the position of the selected transit point are inputted. The route searcher 904 searches a combination of the roads, thereby determining the route or routes which connect the input coordinates along the roads. Further, among the searched routes, a route which satisfies predetermined conditions, such as the shortest route in terms of distance or time, or the like is outputted.

In the first type of conventional map display apparatus, however, there is no information about through which roads among the roads stored in the road data storing unit 801 the route output as a broken-line figure passes. Even if data relating to distances, required times, and the like for sections of the roads had previously been stored in the road data storing unit 801, such data is not used. Since the route is approximately displayed by a broken line, if the reduction ratio is known, the distance can be obtained by a theorem of three squares. However, in a case where a curved route is selected, unless many coordinates are input, the broken line which is output and the desired route do not coincide and an accurate distance cannot be obtained. Further the process of accurately inputting many coordinates with the mouse 706 is very troublesome.

In the second type of conventional map display apparatus, since the desired route is searched from many combinations of road data, it takes a long time until the route is finally decided. Although the above method is convenient in instances where the user wants to automatically obtain the route of the shortest distance or shortest time, in cases where the user wants to manually set the route and obtain information about the distance, time, and the like of the set route, the automatic searching function is inconvenient because it takes a surplus time. Particularly, to designate a complicated route, coordinates of many transit points have to be accurately inputted by the mouse 706, which process can be very troublesome.

SUMMARY OF THE INVENTION

It is an object of the invention to enable a desired route to be selected from a road network shown on a display screen by a simple operation using coordinate input means.

Another object of the invention is to make it possible to properly and efficiently perform a process for determining a suitable road from road data having branches based on an instruction of the operator.

Still another object of the invention is to enable a road selected by the operator to be properly and efficiently discriminated from a plurality of roads displayed.

A further object of the invention is to provide a display which can sequentially discriminate sections which are selected in accordance with instructing operations that are executed in a plurality of displayed roads.

Yet another object of the invention is to enable the operator to select a desired route on a screen which displays a plurality of road data including branches and junctions.

DETAILED DESCRIPTION OF THE PREFERRED EMBODIMENTS

Embodiments of the invention will be described below with reference to the drawings.

[First embodiment]

Figure 1:
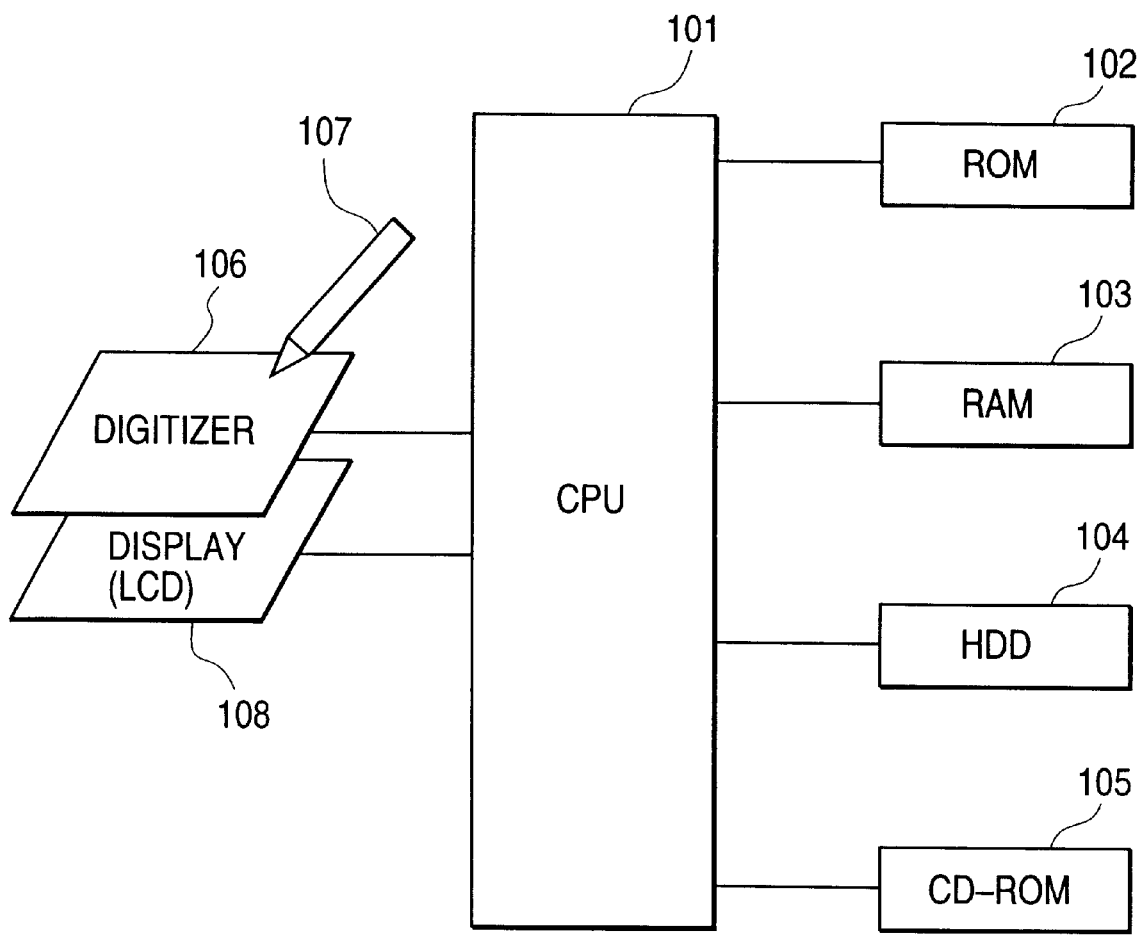
FIG. 1 is a block diagram showing the hardware configuration of a map display apparatus according to a first embodiment of the invention.

A first embodiment of the invention will be described with reference to FIGS. 1 to 4. FIG. 1 is a block diagram showing the hardware configuration of a map display apparatus according to the first embodiment of the invention. In the diagram, reference numeral 101 denotes a CPU (central processing unit) for controlling the whole apparatus; 102 denotes a ROM (read only memory) for storing a control program which is executed by the CPU 101; 103 denotes a RAM (random access memory) in which map data, a control program, and the like are stored; 104 denotes a HDD (hard disk drive) in which the map data, control program, and the like are stored; 105 denotes a CD-ROM (compact disc—read only memory) in which the map data, control program, and the like are stored; 106 denotes a digitizer for inputting coordinates of a point instructed selected on a screen, which will be explained below display; 107 denotes a pen for selecting a point on the display screen, which will be explained below; and 108 dentes a liquid crystal display (LCD) or the like for displaying a road network or the like. The digitizer 106 and display 108 can be integrated in a single device or can be made as individual devices. With digitizer 106 and display 108, it is sufficient to use coordinate input means such as a mouse, tablet, or the like, for instructing a desired position on the display screen of the display 108. It is also possible to construct a display 108 in which a touch panel is provided on the display screen so that coordinates can be input by the operator using the touch panel. Map data stored in the CD-ROM 105 is read out and stored into the RAM 103 or HDD 104 as necessary. The map data includes road data, map images, and the like, which will be explained below. The map data is processed by the program which is executed by the CPU 101 and is displayed on the display 108. By depressing a tip of the pen 107, the coordinates of the instructed point are inputted by the digitizer 106.

Figure 2:
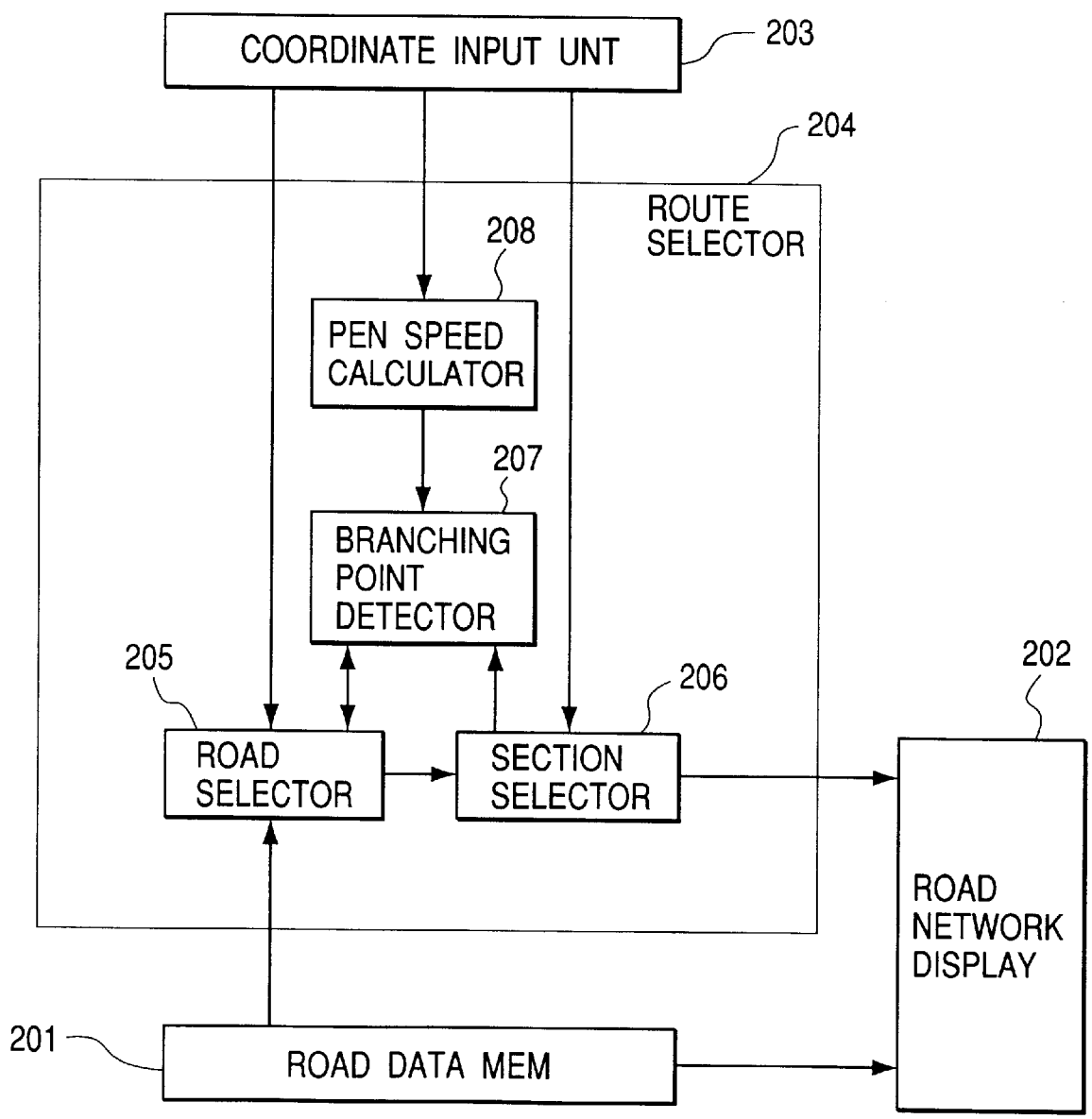
FIG. 2 is a functional block diagram of the map display apparatus.

FIG. 2 is a functional block diagram of the map display apparatus according to this embodiment. In the diagram, reference numeral 201 denotes a road data storing unit; 202 denotes a road network display; 203 denotes a coordinate input unit; and 204 denotes a route selector. The route selector 204 has a road selector 205, a section selector 206, a branching point detector 207, and a pen speed calculator 208. The road selector 205 compares the coordinate data for the instructed position, which was inputted by the coordinate input unit 203, with the position information of the road data read out from the road data storing unit 201, thereby determining the road displayed near the instructed position. Even when the road data it is determined is vector data, whether a line corresponding to the vector data and the instructed position are close. A predetermined threshold value stored in the RAM 103 can be used as a reference for this determination.

The data which is stored in the road data storing unit 201 has includes at least one set of road data comprising: coordinate data or vector data for displaying a road such as a roadway, railroad, or the like on the screen; and data indicative of the position of a branching point with another road. The road data is assembled for every road by collecting data from a start point to an end point of each road. Road data for as many as the number of roads which can be displayed on the display 108 is stored in the road data storing unit 201. Further, by adding data relating to distance, required time, and the like for sections of the road, information such as distance, required time, and the like regarding the route which is obtained by connecting a plurality of sections and a plurality of roads can be outputted. The road network display 202 reads out road data for a predetermined section and displays a road network on the screen. A map image displayed on the screen can be scrolled in accordance with an input of a scroll instruction. Thus, a map image larger than the size of display screen can be viewed.

Figure 3:
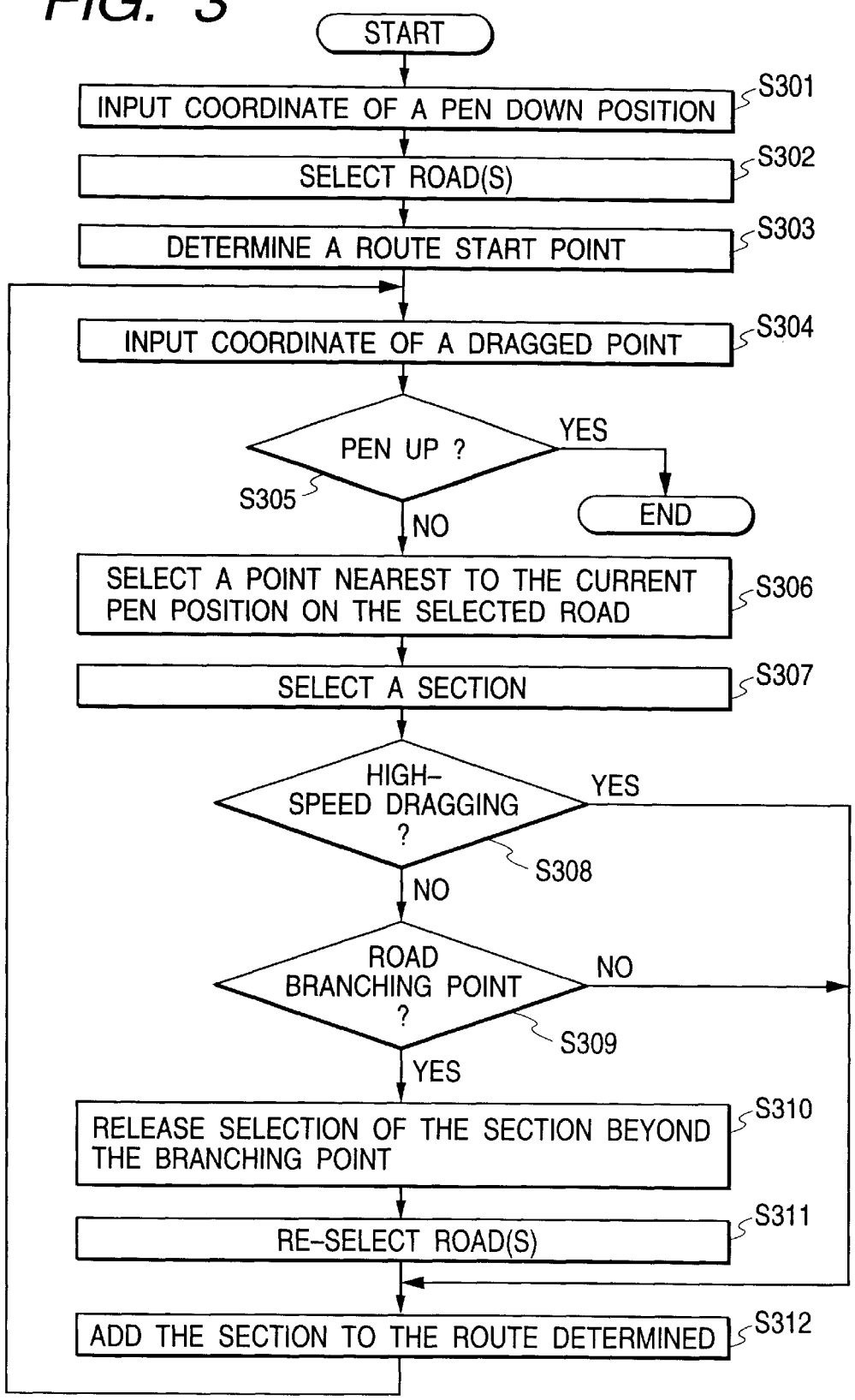
FIG. 3 is a flowchart showing a control procedure for the route inputting operation in the map display apparatus.

The route inputting operation according to this embodiment will now be described with reference to a flowchart of FIG. 3. This operation begins after the map and roads have already been displayed on the display 108 by the road network display 202. The CPU 101 reads out the control program stored in the ROM 102 and executes the process shown in FIG. 3 in accordance with the read-out control program.

First in step S301, the coordinates of a pen down position are inputted by the coordinate input unit 203. In step S302, road data for the section displayed is read out from the road data storing unit 201 by the road selector 205, and the road closest to the pen down position is determined and selected. At this time, in case of comparing the coordinates which are inputted by the coordinate input unit 203 with the position indicated by the road data, the road and position displayed when the position instructing operation is performed are compared with the instructed position also in consideration of the scroll display. The same shall also apply to steps S306, S502, and S507. When it is discriminated that there are a plurality of roads which are located near the pen down position to a similar degree, a plurality of roads are selected. Information concerning the selected roads is stored in the RAM 103. In step S303, a point that is the nearest to the pen down position on the road which is being selected by the section selector 206 is selected and is determined as a start point of the road. The coordinates of the start point are stored in the RAM 103 in correspondence with the information concerning the selected roads. In step S304, new coordinates, which are instructed by dragging the pen are, inputted by the coordinate input unit 203. In step S305, whether the pen has been lifted up is determined by the coordinate input unit 203. If the pen has not been lifted up, and is still being dragged, step S306 follows.

In step S306, a point that is the nearest to the present position of the pen on the road which is being selected is selected by the section selector 206. This process is similar to the process in step S303. When a plurality of roads are being selected, one point which is the nearest to the present position of the pen is selected from the points which had been selected on the plurality of roads. The road including the selected one point is kept as the selected road and the other roads are no longer selected. The information concerning the selected road in the RAM 103 is updated. In step S307, the section from the final point to the point which is being selected on the route which has been determined so far and stored in the RAM 103 is selected by the section selector 206 along the road which is being selected and is stored into the RAM 103. In step S308, the moving speed of the pen 107 is calculated by the pen speed calculator 208 from a displacement of the input coordinates per unit time, thereby determining whether the pen is being dragged at a high speed (equal to or greater than a predetermined speed). Since a this determination differs depending on the degree of skill of the user or an individual difference, it is desirable to enable a threshold value to be arbitrarily set by the user.

When it is determined in step S308 that the pen is not being dragged at a high speed, in step S309, the branching point detector 207 checks to see if a branching point with another road exists in the section selected in step S307. This determination can be made by checking whether the branching point data is included in the road data of the relevant section read out from the road data storing unit 201. When it is determined that a branching point with another road exists in the section which is being selected, in step S310, only the section before the branching point is kept selected from the sections which are being selected by the section selector 206 and the selection of the section beyond the branching point is released and the selected section information in the RAM 103 is updated. In step S311, all of the roads in which the information indicative of the connection to the branching point has been stored in the road data storing unit 201 are determined and stored by the road selector 205 as selected road information in the RAM 103. The section information stored as selected section information in the RAM 103 by the section selector 206 is added as a determined route in the RAM 103 in step S312. After that, the processing routine is returned to step S304 and the above processes are repeated until it is determined in step S305 that the pen has been lifted up. The coordinate inputting process in step S304 is executed at predetermined time intervals. When it is determined in step S305 that the pen has been lifted up, the processing routine is finished. The route determined in step S312 is emphasized and displayed by changing to a display format (blink, change in color, change in line type, or the like) that is different from that of the other roads in the map shown display on the display 108. Efficient data, which can specify the determined route, is formed and stored in the RAM 103 at the end of the processing routine. For example, as shown in a specific embodiment, which will be explained below, when the same road of B-C-D-E-F-G is determined, by merely storing B and G, the route between them can be specified by using the road data.

On the other hand, when it is determined that the pen is being dragged at a high speed (equal to or greater than the predetermined speed) in step S308 and when it is determined that a branching point with another road does not exist in the section which is being selected in step S309, the processing routine advances to step S312.

Figure 4:
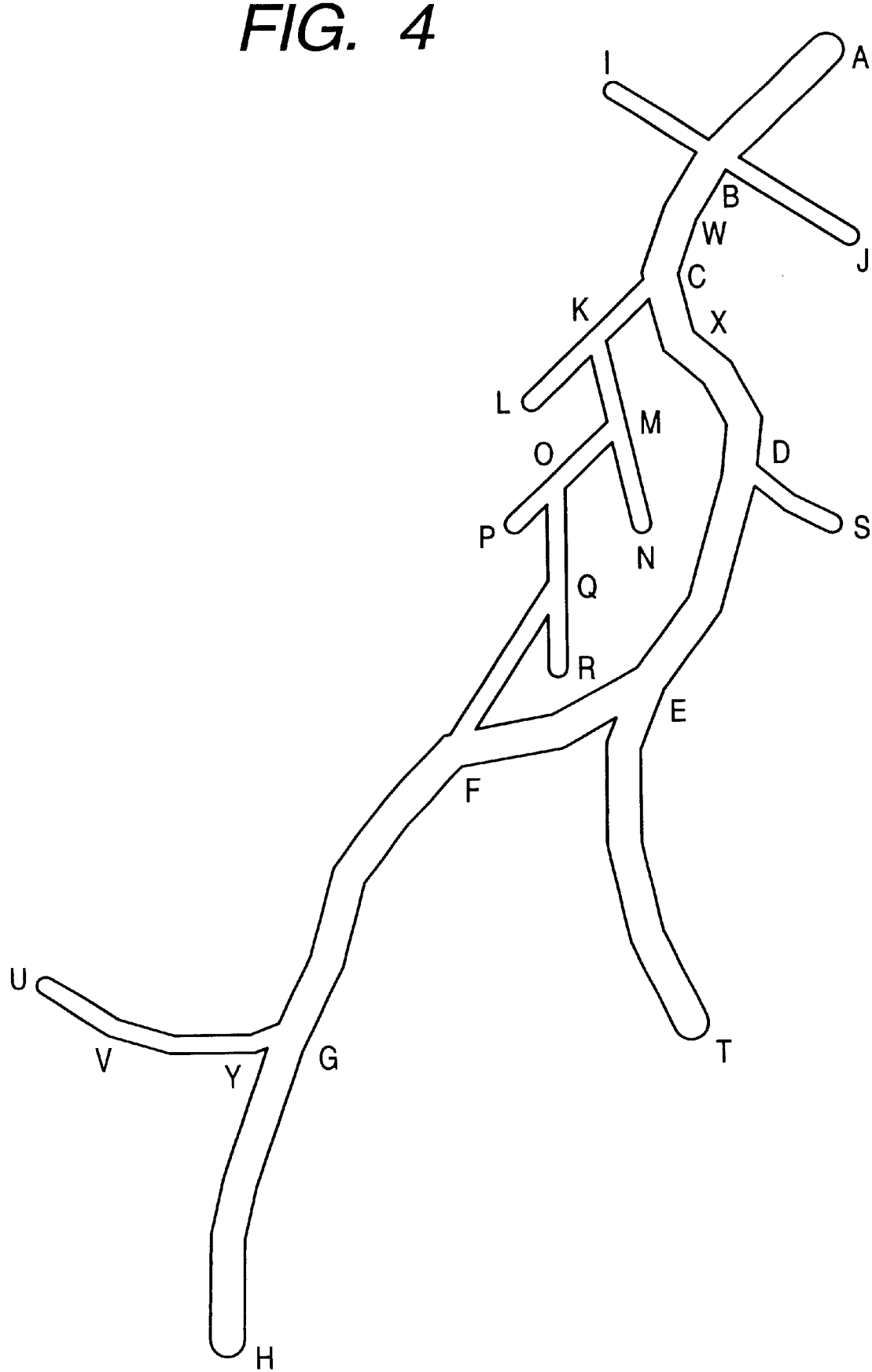
FIG. 4 is a diagram of a map showing a specific road network when it is displayed by the map display apparatus.

Explanation will be further made with reference to a map showing a specific road network illustrated in FIG. 4. Although FIG. 4 shows a diagram in which the road network is schematically shown as an outline, as a map which is displayed on the display 108, it is also possible to display a more real map by overlapping an image of a road network which is formed from the road data onto a map image included in the map data or the like. In FIG. 4, road of No. 1 (A-B-C-D-E-F-G-H, of road of No. 2 (I-B-J), of road No. 3 (C-K-L), a road No. 4 (K-M-N), a road No. 5 (M-O-P), road No. 6 (O-Q-R), road No. 7 (Q-F), road No. 8 (D-S), road No. 9 (E-T), and road No. 10 (G-U) are shown. B, C, D, E, F, G, K, M, 0, and Q are branching points in the roads.

In a state where the road network as shown in FIG. 4 is displayed on the display 108, a case of inputting a route which starts from point B and reaches the point V via points C, D, E, F, and G will now be described.

When the pen is put down at a position near the point B, road of Nos. 1 and 2, each of which passes the point B, are selected. In the course of dragging the pen from point B toward point C, the processes in steps S304 to S307 are executed while the pen is at a location near point W, for example. Coordinate data for point W is inputted, and road No. 1, the only road passing point W, is selected, and the selection of road No. 2 is released. Since there is no branching point between points B and W, thy answer to the query in step S309 is No. In step S312, the section of the road between (points B and W) is determined to be a route. The B-W route is emphasized and displayed. The pen continues to be slowly dragged toward point C. At a point in time when the pen is at a location near point C, the processes in steps S304 to S312 are again executed. Roads Nos. 1 and 3 each of which pass branching point C, are determined in step S309 and are selected in step S311. By continuously dragging the pen from point C toward the point D, the processes in steps S304 to S307 are executed again when the instructing position is near point X. Since there is no branching point between point C and point X, the answer in step S309 is No. In step S312, a section between point C and point X is determined as a route. The B-X route determined until now is emphasized and displayed as compared with the other roads in a manner similar to the above method.

Road No. 1 passing the point X is selected and the selection of road No. 3 is released.

By slowly dragging the pen so as to pass locations near the points D, E, F, and G after that, road No. 1 is subsequently selected and route B-C-D-E-F-G is sequentially determined.

When the pen is dragged from point G to point V, at a point in time when a location near point Y is instructed, only road No. 10 passing point Y is selected in step S307 and the selection of road No. 1 is released. By lifting up the pen at the point V, the route B-C-D-E-F-G-V is inputted.

In the embodiment, there is provided means which a user can more easily input a desired route by dragging the pen between points B and G at a speed higher than a predetermined speed by virtue of the fact points B, C, D, E, F, and G, are all on the same road.

During such high speed dragging, the determination about whether there is a branching point in the selected section is not performed and the same road is continuously selected. This-process can be performed by making the determination in step S308 and by enabling the processes in steps S309 to S311 to be skipped. There is no need to drag along the actual road. The pen can be dragged linearly between points B and G or the pen can move along a curved path. Either was the route B-C-D-E-F-G road No. 1 is automatically selected. When the present position reaches point G, by reducing the dragging speed, whether the route is branched another road, in this case road No. 10, or is determined.

As another route for example, when the operator wants to input a route which starts from point B and reaches point V via points C, K, M, O, Q, F, and G, if the pen is slowly dragged in section of C-K-M-O-Q-F, a route along the locus of the drag can be selected by determining a branch at each branching point.

A moving route of a moving apparatus which can be controlled by a computer, for example, an automobile or an electric carrying vehicle, can be controlled by using the information of the decided route. Or, it is also possible to construct in a manner such that the moving route of such a moving apparatus is compared with information about the decided route, and when the moving apparatus is moving along a different route, an attention message is outputted or a control command for correction is generated, thereby controlling the motion.

According to the embodiment described above, since the coordinates of many points can be accurately inputted at a high speed by the dragging operation with the pen 107, a route of a wide range or a detailed route can be easily inputted. By successively changing the dragging speed, the easy selection of the same road and the instruction to branch to another road can be performed by one dragging operation. Generally, when the road, railroad, or the like is used, since there are many cases where the same road over a relatively long distance is used, if the same road is easily selected, a large advantage is obtained. Since the road data except for the road which is being selected is not referred during the high speed drag, the high speed process can be performed. Even during the low speed drag, since the road data of the road which is being selected is not referred at positions except for the branching points, even if a large amount of coordinate data is processed, a degree of reduction of the processing speed is small. There is, consequently, an effect that a target route can be rapidly inputted.

[Second embodiment]

A second embodiment of the invention will now be described. Although the embodiment is substantially similar to the foregoing first embodiment, the second embodiment is characterized in that the road which is being selected in step S301 or S311 is emphasized and displayed. As mentioned in the first embodiment, although the decided route is also emphasized and displayed, it is more preferable if the decided route and the selected road can be distinguished. Further, in the case where each road is displayed in different colors, it is also necessary to distinguish the decided route and the road which is being selected from these roads.

For example, it is now assumed that the toll roads are displayed in blue, the general national roads are displayed in red, the main local roads are displayed in green, the general roads of urban and rural prefectures are displayed in yellow, and the other roads are displayed in gray. Each of the roads which are displayed without being emphasized is displayed by a pale color tone. Each section of road along the decided route is displayed by a deep color tone. Further, in the embodiment, each of the roads which are being selected is displayed by a color tone of an intermediate brightness. When the selection of the road is released, the color tone of the intermediate brightness is returned to a pale color tone. In this method, since only the road which is being selected among the roads which are displayed as a whole by a pale color tone is displayed by a color tone of an intermediate brightness, it is emphasized. Since the decided route is displayed by the deep color tone, it is further emphasized.

In FIG. 4, a case of inputting a route which starts from point B and reaches point V via points C, D, E, F, and G will now be described.

At first, all of the sections are displayed by the pale color tones. When the pen is put down at a location near point B, road Nos. 1 and 2 passing point B are selected. Thus, section A-B-C-D-E-F-G-H of road No. 1 and section of (I-B-J) road No. 2 are displayed by a color tone of intermediate brightness. When dragging from point B toward point C, point W is inputted. Therefore, road No. 1 the only road passing point W is selected and the selection of road No. 2 is released. Section B-W is determined as a route. Thus, the color tone of section I-B-J of road No. 2 is returned to the pale color tone and section B-W of road of No. 1 is displayed by the deep color tone. Section A-B and section W-C-D-E-F-G-H of road No. 1 are held in the intermediate color tone because road No. 1 is still being selected. When the pen is slowly dragged to a location near point C, road Nos. 1 and 3, each of which pass point C, are selected. Thus, section C-K-L of road No. 3 is also displayed by the intermediate color tone. Since section B-C of road No. 1 has been determined as a route, it is displayed by the deep color tone. Section A-B and section of C-D-E-F-G-H road No. 1 are held in intermediate the color tone because road No. 1 is still being selected. When dragging from point C toward point D, the point X is inputted. Therefore, road No. 1, the only road passing point X, is selected and the selection of road No. 3 is released. Thus, the color tone of section C-K-L of road No. 3 is returned to the pale color tone. Section B-C-X of road No. 1 is displayed by the deep color tone. Section A-B and section X-D-E-F-G-H of road No. 1 are held in the intermediate color tone because road No. 1 is still being selected. After that, by slowly dragging so as to pass a location near each of points D, E, F, and G, road No. 1 is subsequently selected and route B-C-D-E-F-G is sequentially determined. Thus, section B-C-D-E-F-G of road No. 1 is displayed by a deep color tone. When the pen reaches a location near point G, road No. 10 is selected and section G-U of road No. 10 is displayed by the intermediate color tone. Section A-B and section G-H of road No. 1 are held in the intermediate color tone because road No. 1 is still being selected. By dragging from point G toward point V, point Y on is inputted. Therefore, road No. 10, the only road passing point Y, is selected and the selection of road No. 1 is released. Thus, the color tones of section A-B and section G-H of road No. 1 are returned to the pale color tone and section G-Y of road No. 10 is displayed by the deep color tone. Since section of B-C-D-E-F-G of road No. 1 has already been determined, it is held in the deep color tone. By lifting up the pen at the point V, route of B-C-D-E-F-G-V is inputted. Consequently, section B-C-D-E-F-G-V is displayed by the deep color tone.

A case of dragging at a high speed will now be described.

By putting down the pen at point B and dragging to point W at a low speed in a manner similar to that mentioned above, section of B-W of road No. 1 is determined as a route and only road No. 1 is selected. Thus, section B-W is displayed by the deep color tone. Section A-B and section W-C-D-E-F-G-H are displayed by the intermediate color tone. The pen then is dragged to point G at a high speed without lifting up the pen. Since the selection state of the road and the decision state of the route are not changed during the high speed drag, the color tone is not changed. By reducing the dragging speed at a location near point G, the route B-C-D-E-F-G along road No. 1 is selected and displayed by the deep color tone.

In this embodiment, by emphasizing and displaying the road which is being selected, a location where the same road continues for a long distance can be known at a glance and it is possible to easily know a range in which the high speed drag can be used. When the pen reaches the branching point during the low speed drag, the branch road is selected and emphasized and displayed, so that the direction in which the road branches can can be known. Since the branching points are ignored during the high speed drag, the branch roads are displayed without being emphasized, so that it is possible to distinguish whether the drag is being performed at a low speed or a high speed. There is, consequently, an advantage such that the high speed drag and the low speed drag can be easily selectively used.

[Third embodiment]

Figure 5:
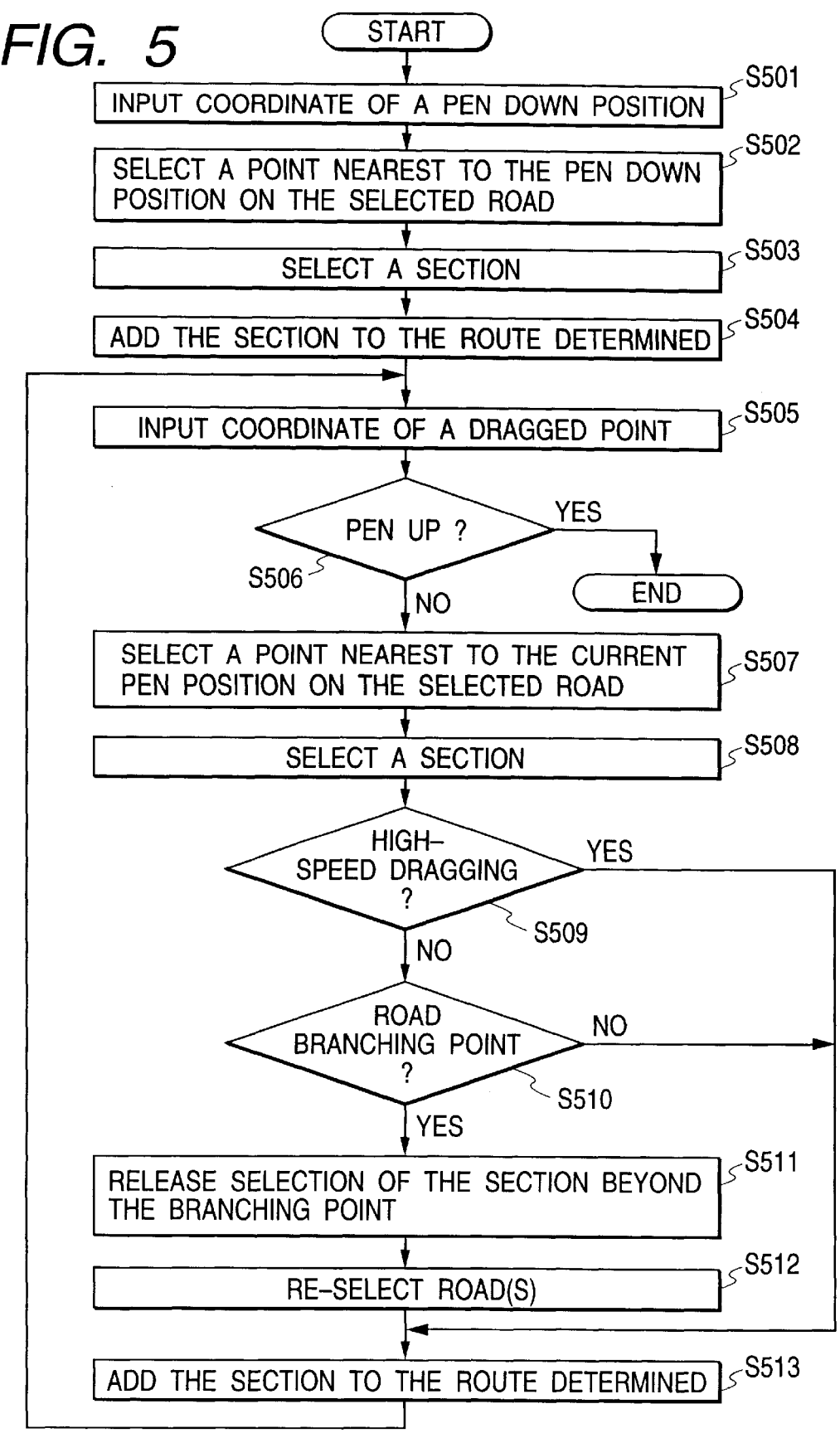
FIG. 5 is a flowchart showing a control procedure for the route inputting operation in a map display apparatus according to a third embodiment of the invention.

A third embodiment of the invention will now be described with reference to FIG. 5. Since the construction of a map display apparatus according to this embodiment is substantially the same as that in FIGS. 1 and 2 described in connection with the first embodiment, it will be described by commonly using both of those diagrams.

In the above first and second embodiments, the road is inputted by dragging. In the third embodiment, however, after the pen is lifted up, by again putting the pen down onto the same road, the same operation as the high speed drag is executed. In other words, now assuming that the time during the pen lift-up time is not counted, the instruction point is moved in an extremely short time as if the high speed movement were performed.

When the second embodiment is used, since the road which is being selected at the time of the pen lift-up operation has already been emphasized and displayed, by putting the pen down onto the road, the route can be successively inputted.

The operation of the map display apparatus according to this embodiment will now be described with reference to a flowchart of FIG. 5. Since the processes in steps S505 to S513 in FIG. 5 are the same as those in steps S304 to S312 in FIG. 3 in the foregoing first embodiment, their descriptions are omitted and only the processing steps of S501 to S504 which are peculiar to this embodiment 3 will be described.

A part of the route has already preliminarily been inputted by an operation similar to the foregoing second embodiment. The processing routine shown in the flowchart of FIG. 5 is started from the time point when the pen is newly put down. It is also assumed that the road which has been being selected when the pen is lifted up has already been emphasized and displayed.

In step S501, the coordinates of the pen-down position are inputted by the coordinate input unit 203 (refer to FIG. 2). A point that is the nearest to the pen-down position is selected on the road which is being selected. When a plurality of roads are being selected, one point that is the nearest to the pen-down position is selected from the points on those roads. Only the road including this point is left selected and the selection of the other roads is released. The emphasis display of the road for which the selection was released is cancelled and the display state is returned to the display as it was before it is emphasized and displayed. In step S503, the section which is being selected is selected from the final point of the route which was determined so far along the road that is being selected by the section selector 206. In step S504, the section which is being selected is added to the route determined so far by the section selector 206. The decided road is further emphasized and displayed. Processes after step S505 are subsequently executed.

In this embodiment, if the pen is lifted up during the route inputting operation, for example to perform another operation, the route inputting operation can thereafter be continued. For example, an operation such as scrolling, zooming or the like of the picture plane can be executed during the route inputting operation. This is convenient when inputting a route spanning a wide range.

[Fourth embodiment]

Figure 6:
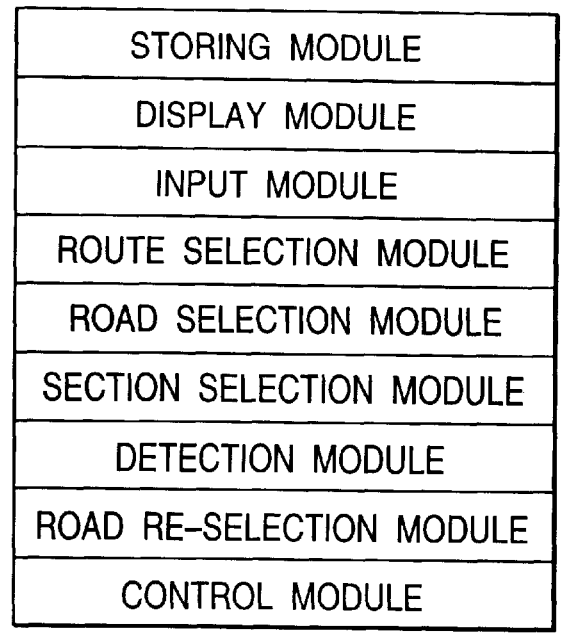
FIG. 6 is a diagram showing each module of a program which is stored in a storing medium of the invention.
Figure 7:
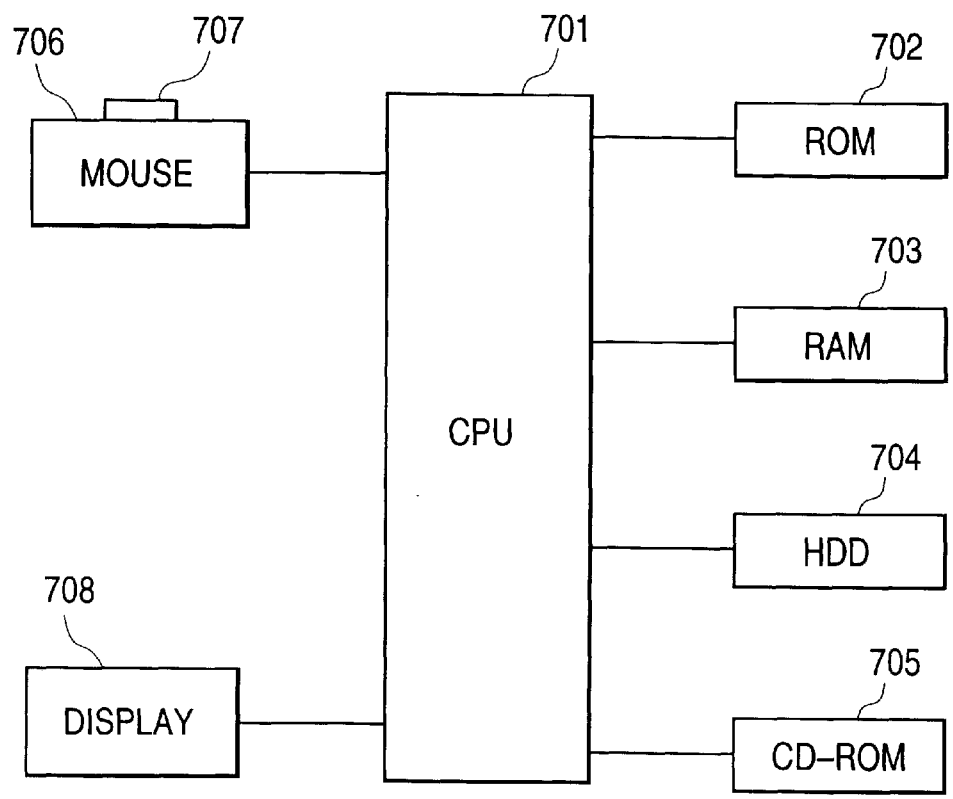
FIG. 7 is a block diagram showing the hardware configuration of a conventional map display apparatus.
Figure 8:
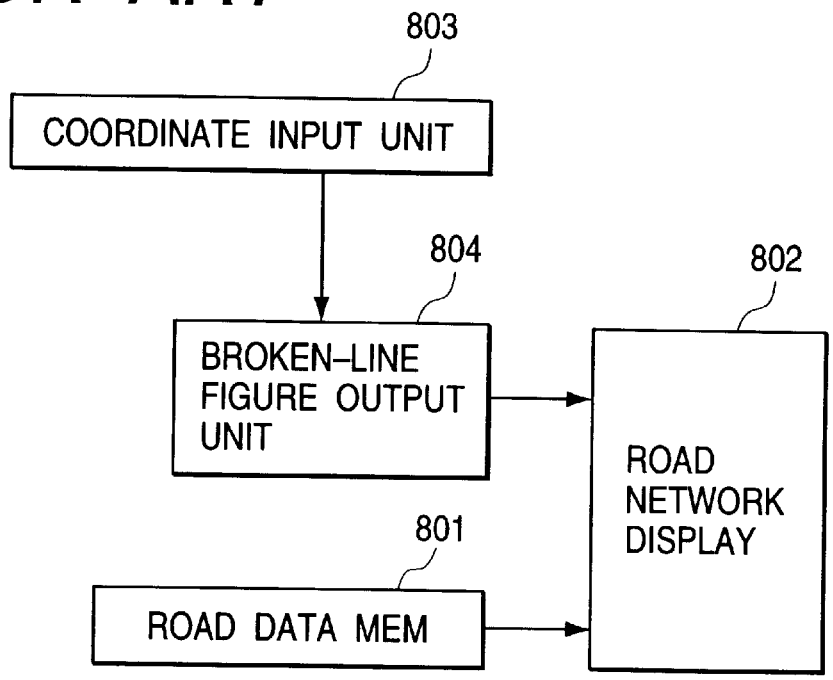
FIG. 8 is a functional block diagram of one type of conventional map display apparatus.
Figure 9:
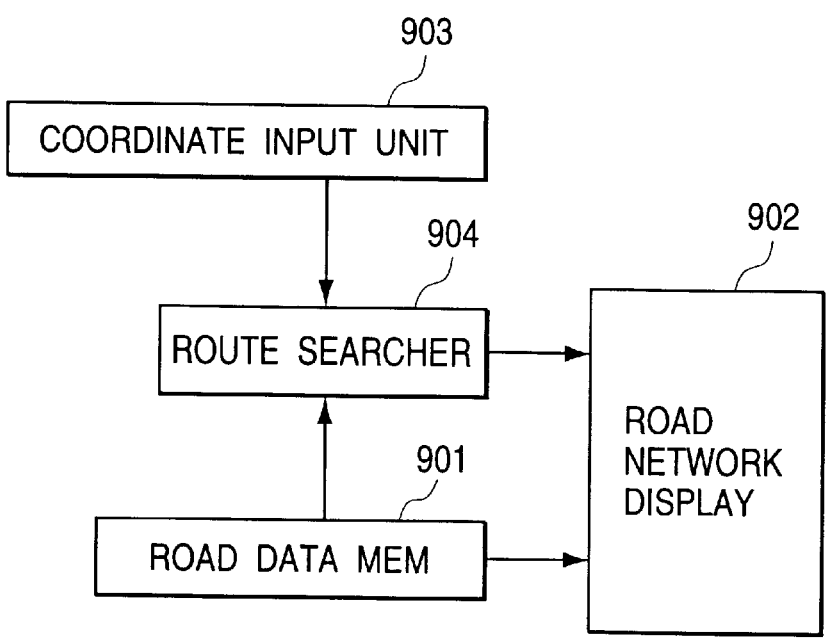
FIG. 9 is a functional block diagram of a second type of conventional map display apparatus.

A storing medium of the invention will now be described with reference to FIG. 6. In the storing medium, to store a program for controlling a map display apparatus to display a map onto the screen, as shown in FIG. 6, for example, it is sufficient to store program codes having program modules such as "storing module", "display module", "input module", "route selection module", "road selection module", "section selection module", "detection module", "road re-selection module", and "control module".

The "storing module" is a program module to store the road data. The "display module" is a program module to display a road network onto the screen. The "input module" is a program module to input the coordinates of an instructed point on the screen. The "route selection module" is a program module to select a route of the road network based on the input coordinates inputted by the input module. The "road selection module" is a program module to select a road near the input coordinates. The "section selection module" is a program module to select a section near the input coordinates on the road selected by the road selection module. The "detection module" is a program module to detect a branching point of the road when the section is selected by the section selection module. The "road re-selection module is a program module to re-select the road when the branching point is detected by the detection module. The "control module" is a program module to control the re-selection of the road by the road re-selection module on the basis of the moving speed of the input coordinates.

The control module functions in a manner such that when the input coordinates are moving at a predetermined speed or more, the road is not rep selected at a branching point. The display module displays the road which is being selected by the road selection module and the other roads so that they can be distinguished.

As described in detail above, according to the map display method and apparatus of the invention, since the process is executed only with respect to the road which is being selected, even if many coordinates are inputted, the processing speed is not so reduced. Therefore, even if a route spanning a wide range or a detailed route is inputted, the process can be performed at a high speed. Moreover it is possible to easily, promptly, and accurately input a desired route.

According to the storing medium of the invention, the foregoing map display apparatus can be smoothly controlled.

Although each of the foregoing embodiments of the invention has been described with respect to the example in which the data to be handled is map data and road data, the invention is not so limited The invention also can be applied to an operation and a process which are provided for displayed line data and for selecting a partial section in this line or an operation and a process for selecting a desired route of the operator on a screen displayed in a state where a plurality of lines are branched or joined.

What is claimed is:

1. An image processing method comprising the steps of:
   (i) storing road data including data relating to branching points;
   (ii) displaying an image showing a road on the basis of the road data;
   (iii) inputting an instructing position on the displayed image;
   (iv) selecting at least one road which is determined to be close to the instructing position and selecting a position on that road by comparing the inputted instructing position with the stored road data;
   (v) inputting a next instructing position on the displayed image;

(vi) selecting at least one road which is determined to be close to the next instructing position and selecting a position on that road by comparing the inputted next instructing position with the stored road data:

(vii) determining a route on the selected road or roads in accordance with the next instructing position; and (viii) repeating steps (v)–(vii) for a plurality of instructing positions continuously inputted.

2. A method according to claim 1, further comprising the step of determining whether there is a branching point of the road between two instructing positions continuously inputted, wherein, when it is determined that there is a branching point of the road, one road is selected from all of the roads passing the branching point that were selected in step (iv) or (vi), the one road being close to an instructing position that is inputted after the branching point.

3. A method according to claim 1, further comprising the step of determining whether there is a branching point of the road between two instructing positions, wherein, when it is determined that there is a branching point of the road, a section up to the branching point is determined as a route in step (vii), but a determination about a section after the branching point is not made until a next branching point is determined.

4. A method according to claim 1, wherein the plurality of instructing positions are obtained with coordinate values instructed at predetermined time intervals by a coordinate input device.

5. A method according to claim 1, wherein the inputted instructing position and the road data are compared and the road to be selected is set to a road located closest to the instructing position.

6. A method according to claim 1, wherein the road data shows a line specified by a plurality of position data.

7. A method according to claim 1, wherein the route is changed to a display format in which the route can distinguished from the other roads in accordance with the determination of the route.

8. A method according to claim 7, wherein the changed display format of the determined route comprises a change in color.

9. A method according to claim 1, further comprising the steps of:

discriminating whether there is a branching point of the road between two instructing positions; and when it is determined that there is a branching point of the road in said discriminating step, selecting in step (iv) or (vi) all of the roads passing the branching point, wherein in step (iv) or (vi) a road closest to the next instructing position is selected from the selected roads.

10. A method according to claim 9, wherein the road selected in step (iv) or (vi) is changed to a display format in which the road can be distinguished from the other roads.

11. A method according to claim 1, wherein information which can specify the determined route is formed and stored.

12. A method according to claim 1, further comprising the steps of:

determining whether the instructing posit-on is moving at a predetermined moving state from the plurality of instructing positions continuously inputted; and deciding whether a determination about a branching point of the road between two instructing positions is executed in accordance with a result of the moving state determination.

13. A method according to claim 12, wherein the predetermined moving state is a predetermined speed.

14. A method according to claim 1, wherein a moving route of a moving device is controlled in accordance with the determined route.

15. A method according to claim 1, wherein the determined route is compared with a moving route of a moving device and a message according to a result of the comparison is outputted.

16. A method according to claim 1, wherein the determined route is compared with a moving of a moving device and a command according to a result of the comparison is outputted.

17. A method according to claim 1, wherein the image showing the road is displayed on a liquid crystal display.

18. A method according to claim 1, wherein the image showing the road is displayed on a CRT.

19. A method according to claim 1, wherein the instructing position is inputted by coordinate input means overlaid integratedly on a display which displays the image showing the road.

20. A method according to claim 1, wherein the road data is constructed for each road by collecting data from a start point to an end point of the road, and the road from the start point to the end point is selected in step (iv) or (vi).

21. A method according to claim 1, wherein the route is determined in the determining step when a branching point is detected while the plurality of instructing positions are continuously inputted.

22. A method according to claim 1, wherein the selected road is changed to a display format in which the selected road can be distinguished from the other roads.

23. A method according to claim 22, wherein the changed display format of the selected road comprises a change in color.

24. An image processing apparatus comprising:

storing means for storing road data including data relating to branching points;

display means for displaying an image showing a road on the basis of the road data;

input means for continuously inputting a plurality of instructing positions on the displayed image;

selecting means for selecting at least one road which is determined to be close to each instructing position and selecting a position on that road by comparing the inputted instructing position with the stored road data; and determining means for determining a route on the selected road or roads in accordance with each successively inputted instructing position.

25. An apparatus according to claim 24, further comprising branch discriminating means for discriminating whether there is a branching point of the road between two instructing positions which are continuously inputted, wherein when it is determined by said branch discriminating means that there is a branching point of the road, said determining means determines a route close to an instructing position that is inputted after the branching point from all of the roads passing the branching point that were selected by said selecting means.

26. An apparatus according to claim 24, further comprising discriminating means for discriminating whether there is a branching point of the road between two instructing positions which are continuously inputted, wherein when it is discriminated that there is a branching point branch of the road, the determining means determines a section up to the branching point as a route, but does not make a determination for a section after the branch until a next branching point is discriminated.

27. An apparatus according to claim 24, wherein the plurality of instructing positions which are inputted by said input means are obtained with coordinate values instructed at predetermined time intervals by a coordinate input device.

28. An apparatus according to claim 24, wherein said selecting means compares the inputted instructing position with the road data and selects a road located closest to the Instructing position.

29. An apparatus according to claim 24, wherein the road data shows a line which is specified by a plurality of position data.

30. An apparatus according to claim 24, wherein said display means changes the determined route to a display format in which roads in the route can be distinguished from the other roads in accordance with the determination of the route by said determining means and displays the changed route.

31. An apparatus according to claim 30, wherein the changed display format of the determined route comprises a change in color.

32. An apparatus according to claim 24, further comprising:
discriminating means for discriminating whether there is a branching point of the road between the instructing positions which are continuously inputted, wherein when it is discriminated by said discriminating means that there is a branching point of the road, said selecting means selects all of the roads passing the branching point and then selects one road closest to the next instructing position from the selected roads.

33. An apparatus according to claim 32, wherein said display means changes the road selected by said selecting means to a display format in which the road can be distinguished from the other roads and displays the changed road.

34. An apparatus according to claim 24, further comprising:
route information forming means for forming information which can specify the route determined by said determining means; and
storing means for storing the route information formed by said route information forming means.

35. An apparatus according to claim 24, further comprising:
moving state discriminating means for discriminating whether the instructing position is moving at a predetermined moving state from the plurality of instructing positions which are inputted by said input means; and
deciding means for deciding whether the discrimination about a branching point of the road between two instructing positions is executed in accordance with a discrimination result of said moving state discriminating means.

36. An apparatus according to claim 35, wherein the predetermined moving state is a predetermined speed.

37. An apparatus according to claim 24, further comprising control means for controlling a moving route of a moving device in accordance with the route determined by said determining means.

38. An apparatus according to claim 24, further comprising control means for comparing the route determined by said determining means with a moving route of a moving device and controlling so as to output a message according to a result of the comparison.

39. An apparatus according to claim 24, further comprising command generating means for comparing the route determined by said determining means with a moving route of a moving device and generating a command according to a result of the comparison.

40. An apparatus according to claim 24, wherein said display means comprises a liquid crystal display.

41. An apparatus according to claim 24, wherein said display means comprises a CRT.

42. An apparatus according to claim 24, wherein said input means comprises a coordinate input device overlaid integratedly on a display displaying the image showing the road.

43. An apparatus according to claim 24, wherein the road data is constructed for each road by collecting data from a start point to an end point of the road, and the selecting means selects the road from the start point to the end point.

44. An apparatus according to claim 24, wherein the determining means determines the route when a branching point is detected while the plurality of instructing positions are continuously inputted.

45. An apparatus according to claim 24, wherein the selected road is changed to a display format in which the selected road can be distinguished from the other roads.

46. An apparatus according to claim 45, wherein the changed display format of the selected road comprises a change in color.

47. A computer-usable medium encoded with a program for performing the steps of:
(i) storing road data including data relating to branching points;
(ii) displaying an image showing a road on the basis of the road data;
(iii) inputting an instructing position on the displayed image;
(iv) selecting at least one road which is determined to be close to the instructing position and selecting a position on that road by comparing the inputted instructing position with the stored road data;
(v) inputting a next instructing position on the displayed image;
(vi) selecting at least one road which is determined to be close to the next instructing position and selecting a position on that road by comparing the inputted next instructing position with the stored road data:
(vii) determining a route on the selected road or roads in accordance with the next instructing position; and
(viii) repeating steps (v)–(vii) for a plurality of instructing positions continuously inputted.

48. A computer-usable medium encoded with a program according to claim 47, the program further performing the step of determining whether there is a branching point of the road between two instructing positions continuously inputted,
wherein, when it is discriminated that there is a branching point of the road, one road is selected from all of the roads passing the branching point that were selected in step (iv) or (vi), the one road being close to an instructing position that is inputted after the branching point.

49. A computer-usable medium encoded with a program according to claim 47, the program further performing the step of determining whether there is a branching point of the road between two instructing positions,
wherein, when it is determined that there is a branching point of the road, a section up to the branching point is determined as a route in step (vii), but a determination about a section after the branching point is not made until a next branching point is determined.

50. A computer-usable medium encoded with a program according to claim 47, wherein the plurality of instructing positions are obtained with coordinate values instructed at predetermined time intervals by a coordinate input device.

51. A computer-usable medium encoded with a program according to claim 47, wherein the inputted instructing position and the road are compared and the road to be selected is set to a road located closest to the instructing position.

52. A computer-usable medium encoded with a program according to claim 47, wherein the road data shows a line specified by a plurality of position data.

53. A computer-usable medium encoded with a program according to claim 47, wherein the route is changed to a display format in which the route can be distinguished from the other roads in accordance with the determination of the route.

54. A computer-usable medium according to claim 53, wherein the changed display format of the decided route comprises a change in color.

55. A computer-usable medium encoded with a program according to claim 47, the program further performing the steps of:

discriminating whether there is a branching point of the road between two instructing positions; and when it is discriminated that there is a branching point of the road in said discriminating step, selecting in step (iv) or (vi) all of the roads passing the branching point, wherein in step (iv) or (vi) a road closest the next instructing position is selected from the selected roads.

56. A computer-usable medium encoded with a program according to claim 55, wherein the road selected in step (iv) or (vi) is changed to a display format in which the road can be distinguished from the other roads.

57. A computer-usable medium encoded with a program according to claim 47, wherein information which can specify the determined route is formed and stored.

58. A computer-usable medium encoded with a program according to claim 47, the program further performing the steps of:

determining whether the instructing position is moving at a predetermined moving state from the plurality of instructing positions continuously inputted; and deciding whether a determination about a branching point of the road between two instructing positions is executed in accordance with a result of the moving state determination.

59. A computer-usable-medium according to claim 58, wherein the predetermined moving state is a predetermined speed.

60. A computer-usable medium encoded with a program according to claim 47, wherein a moving route of a moving device is controlled in accordance with the determined route.

61. A computer-usable medium encoded with a program according to claim 47, wherein the determined route is compared with a moving route of a moving device and a message according to a result of the comparison is outputted.

62. A computer-usable medium encoded with a program according to claim 47, wherein the determined route is compared with a moving route of a moving device and a command according to a result of the comparison is outputted.

63. A computer-usable medium encoded with a program according to claim 47, wherein the image showing the road is displayed on a liquid crystal display.

64. A computer-usable medium encoded with a program according to claim 47, wherein the image showing the road is displayed on a CRT.

65. A computer-usable medium encoded with a program according to claim 47, wherein the instructing position is inputted by coordinate input means overlaid integratedly on a display which displays the image showing the road.

66. A computer-usable medium according to claim 47, wherein the road data is constructed for each road by collecting data from a start point to an end point of the road, and the road from the start point to the end point is selected in step (iv) or (vi).

67. A computer-usable medium according to claim 47, wherein the route is determined in the determining step when a branching point is detected while the plurality of instructing positions are continuously inputted.

68. A computer-usable medium according to claim 47, wherein the selected road is changed to a display format in which the selected road can be distinguished from the other roads.

69. A computer-usable medium according to claim 68, wherein the changed display format of the selected road comprises a change in color.

* * * * *

UNITED STATES PATENT AND TRADEMARK OFFICE
CERTIFICATE OF CORRECTION

PATENT NO. : 6,266,611 B1
DATED : July 24, 2001
INVENTOR(S) : Kazuhiro Matsubayashi It is certified that error appears in the above-identified patent and that said Letters Patent is hereby corrected as shown below:

Drawings,
Fig. 2, "UNT" should read -- UNIT --.

Column 2,
Line 5, "onto" should read -- on --.

Column 3,
Line 39, "instructed selected on a" should read -- selected on a display --.
Line 40, "below display;" should read -- below; --.
Line 42, "dentes" should read -- denotes --.

Column 4,
Line 5, "it is determined is vector data" should read -- is vector data, it is determined --.
Line 11, "has" should be deleted.
Line 20, "road," should read -- roads, --.
Line 58, "pen are," should read -- pen, are --.

Column 5,
Line 48, "shown display" should read -- shown --.

Column 6,
Line 1, "of" should be deleted.
Line 2, "H, of road of" should read -- H), road --.
Line 2, "of road" should read -- road --.
Line 3, "a" (both occurrences) should be deleted.
Line 19, "thy" should read -- the --.
Line 21, "(points B and W)" should read -- points B and W --.
Line 26, "3 each of which pass" should read -- 3, each of which passes --.
Line 55, "This-process" should read -- This process --.
Line 59, "was" should read -- way --.
Line 62, "branched" should read -- branched to --.

UNITED STATES PATENT AND TRADEMARK OFFICE
CERTIFICATE OF CORRECTION

PATENT NO. : 6,266,611 B1
DATED : July 24, 2001
INVENTOR(S) : Kazuhiro Matsubayashi It is certified that error appears in the above-identified patent and that said Letters Patent is hereby corrected as shown below:

Column 7,
Line 67, "(I-B-J)" should read -- I-B-J --.

Column 8,
Line 12, "pass" should read -- passes --.
Lines 16 and 40, "of" should be deleted.
Line 16, "road" should read -- of road --.
Line 16, "in" should read -- in the --.
Line 17, "the" should be deleted.
Line 35, "on" should be deleted.
Line 56, "the" (second occurrence) should be deleted.
Line 66, "can can" should read -- can --.

Column 9,
Line 31, "embodiment 3" should read -- embodiment, --.

Column 10,
Line 28, "rep selected" should read -- reselected --.
Line 36, "so" should be deleted.
Line 47, "limited" should read -- limited. --.

Column 11,
Line 4, "data:" should read -- data; --.
Line 38, "can" should read -- can be --.
Line 60, "posit-on" should read -- position --.

Column 12,
Line 11, "moving" (first occurrence) should read -- moving route --.
Lines 55 and 66, "wherein" should read -- wherein, --.

Column 13,
Line 11, "Instructing" should read -- instructing --.

UNITED STATES PATENT AND TRADEMARK OFFICE
CERTIFICATE OF CORRECTION

PATENT NO. : 6,266,611 B1
DATED : July 24, 2001
INVENTOR(S) : Kazuhiro Matsubayashi It is certified that error appears in the above-identified patent and that said Letters Patent is hereby corrected as shown below:

<u>Column 14,</u>
Line 16, "point-to" should read -- point to --.

<u>Column 16</u>:
Line 5, "computer-usable-medium" should read -- computer-usable medium --.

Signed and Sealed this

Thirtieth Day of July, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,266,611 B1
DATED : July 24, 2001
INVENTOR(S) : Kazuhiro Matsubayashi It is certified that error appears in the above-identified patent and that said Letters Patent is hereby corrected as shown below:

Drawings,
Fig. 2, "UNT" should read -- UNIT --.

Column 2,
Line 5, "onto" should read -- on --.

Column 3,
Line 39, "instructed selected on a" should read -- selected on a display --.
Line 40, "below display;" should read -- below; --.
Line 42, "dentes" should read -- denotes --.

Column 4,
Line 5, "it is determined is vector data" should read -- is vector data, it is determined --.
Line 11, "has" should be deleted.
Line 20, "road," should read -- roads, --.
Line 58, "pen are," should read -- pen, are --.

Column 5,
Line 48, "shown display" should read -- shown --.

Column 6,
Line 1, "of" should be deleted.
Line 2, "H, of road of" should read -- H), road --.
Line 2, "of road" should read -- road --.
Line 3, "a" (both occurrences) should be deleted.
Line 19, "thy" should read -- the --.
Line 21, "(points B and W)" should read -- points B and W --.
Line 26, "3 each of which pass" should read -- 3, each of which passes --.
Line 55, "This-process" should read -- This process --.
Line 59, "was" should read -- way --.
Line 62, "branched" should read -- branched to --.

Column 7,
Line 67, "(I-B-J)" should read -- I-B-J --.

UNITED STATES PATENT AND TRADEMARK OFFICE
CERTIFICATE OF CORRECTION

PATENT NO. : 6,266,611 B1
DATED : July 24, 2001
INVENTOR(S) : Kazuhiro Matsubayashi It is certified that error appears in the above-identified patent and that said Letters Patent is hereby corrected as shown below:

Column 8,
Line 12, "pass" should read -- passes --.
Lines 16 and 40, "of" should be deleted.
Line 16, "road" should read -- of road --.
Line 16, "in" should read -- in the --.
Line 17, "the" should be deleted.
Line 35, "on" should be deleted.
Line 56, "the" (second occurrence) should be deleted.
Line 66, "can can" should read -- can --.

Column 9,
Line 31, "embodiment 3" should read -- embodiment, --.

Column 10,
Line 28, "rep selected" should read -- reselected --.
Line 36, "so" should be deleted.
Line 47, "limited" should read -- limited. --.

Column 11,
Line 4, "data:" should read -- data; --.
Line 38, "can" should read -- can be --.
Line 60, "posit-on" should read -- position --.

Column 12,
Line 11, "moving" (first occurrence) should read -- moving route --.
Lines 55 and 66, "wherein" should read -- wherein, --.

Column 13,
Line 11, "Instructing" should read -- instructing --.

UNITED STATES PATENT AND TRADEMARK OFFICE
CERTIFICATE OF CORRECTION

PATENT NO. : 6,266,611 B1
DATED : July 24, 2001
INVENTOR(S) : Kazuhiro Matsubayashi It is certified that error appears in the above-identified patent and that said Letters Patent is hereby corrected as shown below:

<u>Column 14,</u>
Line 16, "point-to" should read -- point to --.

<u>Column 16,</u>
Line 5, "computer-usable-medium" should read -- computer-usable medium --.

Signed and Sealed this

Fourteenth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,266,611 B1
DATED         : July 24, 2001
INVENTOR(S)   : Kazuhiro Matsubayashi It is certified that error appears in the above-identified patent and that said Letters Patent is hereby corrected as shown below:

Drawings,
Fig. 2, "UNT" should read -- UNIT --.

Column 2,
Line 5, "onto" should read -- on --.

Column 3,
Line 39, "instructed selected on a" should read -- selected on a display --.
Line 40, "below display;" should read -- below; --.
Line 42, "dentes" should read -- denotes --.

Column 4,
Line 5, "it is determined is vetor data" should read -- is vector data, it is determined --.
Line 11, "has" should be deleted.
Line 20, "road," should read -- roads, --.
Line 58, "pen are," should read -- pen, are --.

Column 5,
Line 48, "shown display" should read -- shown --.

Column 6,
Line 1, "of" should be deleted.
Line 2, "H, of road of" should read -- H), road --.
Line 2, "of road" should read -- road --.
Line 3, "a" (both occurrences) should be deleted.
Line 19, "thy" should read -- the --.
Line 21, "(points B and W)" should read -- points B and W --.
Line 26, "3 each of which pass" should read -- 3, each of which passes --.
Line 55, "This-process" should read -- This process --.
Line 59, "was" should read -- way --.
Line 62, "branched" should read -- branched to --.

Column 7,
Line 67, "(I-B-J)" should read -- I-B-J --.

UNITED STATES PATENT AND TRADEMARK OFFICE
CERTIFICATE OF CORRECTION

PATENT NO.    : 6,266,611 B1
DATED         : July 24, 2001
INVENTOR(S)   : Kazuhiro Matsubayashi It is certified that error appears in the above-identified patent and that said Letters Patent is hereby corrected as shown below:

<u>Column 8,</u>
Line 12, "pass" should read -- passes --.
Lines 16 and 40, "of" should be deleted.
Line 16, "road" should read -- of road --.
Line 16, "in" should read -- in the --.
Line 17, "the" should be deleted.
Line 35, "on" should be deleted.
Line 40, "of" should be deleted.
Line 56, "the" (second occurrence) should be deleted.
Line 66, "can can" should read -- can --.

<u>Column 9,</u>
Line 31, "embodiment 3" should read -- embodiment, --.

<u>Column 10,</u>
Line 28, "rep selected" should read -- reselected --.
Line 36, "so" should be deleted.
Line 47, "limited" should read -- limited. --.

<u>Column 11,</u>
Line 4, "data:" should read -- data; --.
Line 38, "can" should read -- can be --.
Line 60, "posit-on" should read -- position --.

<u>Column 12,</u>
Line 11, "moving" (first occurrence) should read -- moving route --.
Lines 55 and 66, "wherein" should read -- wherein, --.

<u>Column 13,</u>
Line 11, "Instructing" should read -- instructing --.

UNITED STATES PATENT AND TRADEMARK OFFICE
CERTIFICATE OF CORRECTION

PATENT NO.    : 6,266,611 B1
DATED         : July 24, 2001
INVENTOR(S)   : Kazuhiro Matsubayashi It is certified that error appears in the above-identified patent and that said Letters Patent is hereby corrected as shown below:

<u>Column 14,</u>
Line 16, "point-to" should read -- point to --.

<u>Column 16,</u>
Line 5, "computer-usable-medium" should read -- computer-usable medium --.

This certificate supersedes Certificate of Correction issued July 30, 2002 and January 14, 2003.

Signed and Sealed this

Thirteenth Day of December, 2005

JON W. DUDAS
*Director of the United States Patent and Trademark Office*